United States Patent

Gilford et al.

[15] 3,667,662
[45] June 6, 1972

[54] CAPILLARY TUBE CUTTING AND FEEDING APPARATUS

[72] Inventors: Saul R. Gilford; Ignacio P. Echeagaray, both of Oberlin, Ohio

[73] Assignee: Gilford Instrument Laboratories, Inc., Oberlin, Ohio

[22] Filed: Aug. 18, 1969

[21] Appl. No.: 850,884

[52] U.S. Cl. ..............................225/96.5, 83/231, 83/277
[51] Int. Cl. ..........................................................B26f 3/00
[58] Field of Search..............83/277, 282, 206, 12, 6, 231, 83/411; 225/96.5, 96, 98

[56] References Cited

UNITED STATES PATENTS

| | | | |
|---|---|---|---|
| 1,177,293 | 3/1916 | Anderson | 83/277 X |
| 1,479,623 | 1/1924 | Overton | 83/277 X |
| 1,650,556 | 11/1927 | Weber | 83/231 X |
| 1,968,479 | 7/1934 | Dickerman | 83/277 X |
| 2,686,246 | 8/1954 | Souter | 83/277 X |
| 2,871,622 | 2/1959 | Singer et al. | 225/96.5 |
| 3,512,438 | 5/1970 | Burdge | 83/277 X |

FOREIGN PATENTS OR APPLICATIONS

| | | | |
|---|---|---|---|
| 104,805 | 3/1917 | Great Britain | 225/96.5 |

*Primary Examiner*—Frank T. Yost
*Attorney*—Silverman & Cass

[57] ABSTRACT

A length of capillary tubing is mounted to an apparatus, being carried by a reciprocable carriage and a fixed support serving as a guide. The carriage and support have releasable unilateral respective first and second grab means. The grab means are effective in opposite directions of axial movement of the length of tubing so that movement of the carriage toward the support will hold the length of tubing on the carriage but permit the length to slip past the second grab means, but upon return movement of the carriage the second grab means locks the length in position and the first grab means permits slipping movement of the length of tubing relative to the carriage. In this manner a forward stroke of the carriage will feed a length of tubing past the support and a return, or rearward stroke will return the carriage without concurrent movement of the length of tubing. The length fed, at most equals the length of the forward stroke, but can be varied by suitable means, for example, for the purpose of feeding a small end for trimming. A cutter is driven by and synchronized with return movement of the carriage to score the fed length of tubing. The apparatus includes means supporting a cuvette or carrier into which the tubing end is inserted during the stroke. Means are provided laterally to strain the short free end of the length of tubing beyond the score line to cause the short end to break off, either falling into waste in the case of trim, or being captured in the cuvette in the case of a regular measured length. Means are provided to control the length fed by the carriage.

7 Claims, 2 Drawing Figures

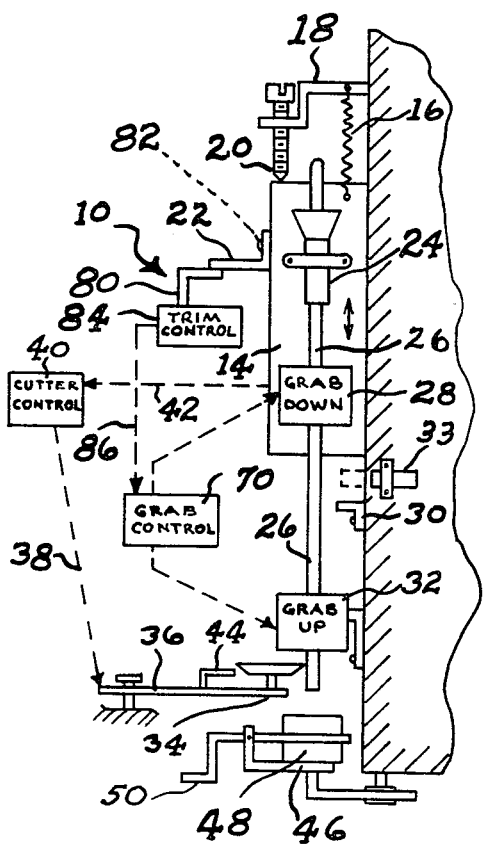
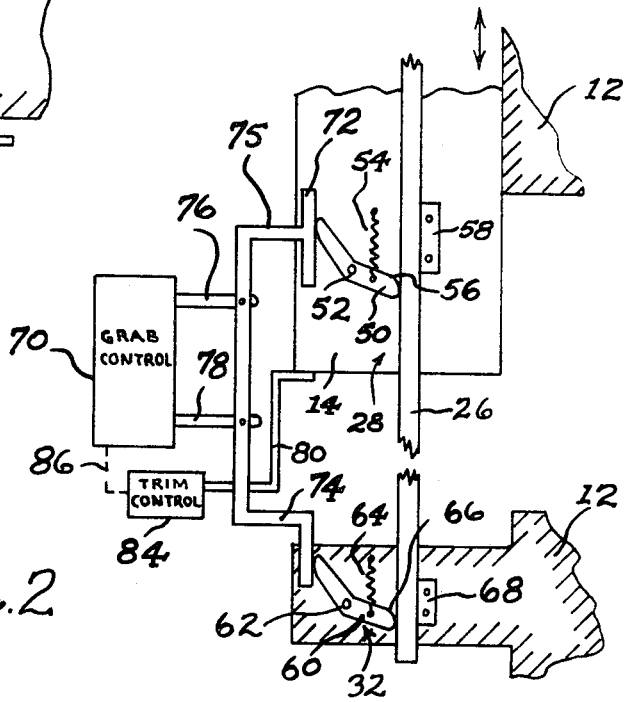

CAPILLARY TUBE CUTTING AND FEEDING APPARATUS

CROSS-REFERENCE TO RELATED APPLICATIONS

The only purpose in referring to other applications herein is to assist in appreciating the nature of the invention and its purposes. None of these applications discloses any form of capillary tubing cutting or feeding mechanism, and none is needed to provide any portion of the disclosure of this application.

The applicant herein is the applicant of application Ser. No. 472,294 filed July 15, 1965, now U.S. Pat. No. 3,475,127, entitled "FLUID SAMPLE MEASURING AND DILUTING METHOD AND APPARATUS" which discloses and claims the basic concept of using accurately cut lengths of capillary tubing for the measurement of liquids. The apparatus comprises capillary tubing of accurate bores which are filled with sample liquids, such as for example, blood. Accurately measured lengths of the tubing thus represent accurate volumes of fluid. One such length is placed in a cuvette or carrier, diluted with a known volume of reagent, and used in making tests upon the dilution.

The lengths of capillary tubing are filled in any one of several methods. Normal filling by capillary action can be achieved, but is not preferred. Other methods employ vacuum for this purpose. The methods and apparatus are disclosed in applications owned by the assignee of this application, as follows:

Ser. No. 781,386 filed Dec. 5, 1968 and
Ser. No. 830,185 filed May 15, 1969.

BACKGROUND OF THE INVENTION

The field of the invention is micro-sampling through the use of capillary tubing. A relatively long length of tubing is filled with a quantity of fluid, and it is desired to cut the length accurately into shorter lengths so that tests may be performed with the volumes of fluid entrained. The problems which are involved are primarily the difficulty in handling lengths of frangible tubing without loss of the entrained fluid and without breaking the same, in addition to achieving accuracy in the cut lengths. Contamination is also a difficulty which must be overcome. The invention herein achieves the ends sought with simplicity, effectiveness and economy.

SUMMARY OF THE INVENTION

The lengths of capillary tubing are inserted one at a time into a machine which in effect divides them into shorter lengths. The machine has a reciprocable carriage that contains a unilateral grab device which opposes movement of the length of tubing in one direction but permits such movement in the other direction. The carriage slides on a support and its stroke is adjusted by a suitable stop member. The support also carries another grab device which is also unilateral in function, but effective in the opposite direction. The length of tubing is engaged into the second grab device, a control and release device for the operation of the grab means being provided to enable this. Once the two grab devices have engaged the length of tubing, each movement of the carriage will feed a short length of tubing past the second grab device. At this point there is a platform upon which a carrier or cuvette is placed so that as the length is fed past the second grab device it is piloted into the cuvette. Spring means returns the carriage and unidirection driving means, such as a clutch device driven by the carriage movement swings a cutter across the length of tubing just before it enters the cuvette. The tubing is now scored so that placing a lateral strain on the free end will break it off, whereupon it will be engaged in the cuvette. The strain may be applied by the simple expedient of tilting the cuvette or using a bending yoke. The carriage may operate the bending yoke at the end of its return stroke. A short length of tubing may be trimmed initially by feeding only such short length past the second grab means, scoring it and breaking the trim end off to permit its discard to waste. Short feed may be accomplished by grab means control and/or using different carriage stroke stop means.

BRIEF DESCRIPTION OF THE DRAWING

FIG. 1 is a highly diagrammatic view of apparatus constructed in accordance with the invention.

FIG. 2 is a more detailed fragmentary view, albeit diagrammatic illustrating the details of the grab means.

DESCRIPTION OF THE PREFERRED EMBODIMENT

The invention herein is illustrated in highly diagrammatic form because it is capable of taking a wide range of mechanical form with great variation in mechanical details.

In FIG. 1 the reference character 10 is used to designate the apparatus generally. There is a support structure 12 upon which a carriage 14 is adapted to slide. The carriage 14 is biased to move upward by means of the spring 16 which is carried on the bracket 18 that also supports an adjustable stop screw 20 by means of which the upward movement of the carriage is limited. The carriage has a handle 22 which enables the carriage manually to be pushed downward as viewed in the illustration against the force of the spring 16. When released, the carriage 14 will move upward. Lever movement may also drive the carriage and operate other parts of the device.

The carriage 14 has a tubing guide 24 mounted thereon so that a long length of capillary tubing such as shown at 26 may be piloted and fed into the apparatus 10. The apparatus may be arranged so that the length of capillary tubing will be disposed in a horizontal plane instead of vertical as shown. Accordingly, reference to directions "up" and "down" should be considered only relative, and illustrative of the apparatus. The tubing length 26 is engaged by the upper unilateral grab mechanism shown as a simple block 28 in FIG. 1, but more detailed in FIG. 2. The grab mechanism 28 holds the tubing 26 against relative movement when the carriage is moved downwardly, but will permit the tubing length to slip relative to the carriage when the carriage 14 is moved upwardly. Accordingly, the block 28 is marked "GRAB DOWN."

The bottom stroke of the carriage 14 is limited by the stop member 30 mounted on the support. The lower end of the length 26 is engaged into the lower unilateral grab mechanism represented by the block 32. This grab mechanism is fixed to the support 12 and as shown is marked "GRAB UP." The mechanism 32 may be identical in construction with the mechanism 28 but since it is mounted on a fixed support, its effective operation is in the opposite sense. When the length of tubing 26 moves downwardly, the grab mechanism 32 releases the same and permits such movement, but when the tubing length is pulled upwardly, the mechanism seizes the same and prevents such upward movement. It will be seen that this action is opposite to that of the upper grab mechanism 28. Thus, the operator can stroke the handle 22 and, assuming that the carriage 14 is pushed all the way to its lower stop member 30, each downward stroke will feed a length of tubing of a dimension equal to the stroke of the carriage past the lower grab mechanism 32. Releasing the carriage will cause the spring 16 to pull it upward to its stop member 20 and during this movement, the length of tubing 26 will be stationary relative to the support 12.

An intermediate stop member 33 may be interposed in the path of the carriage 14 as indicated by the broken line position of said stop member, to limit the stroke of the carriage 14 for certain purposes. Thus, when first a length of tubing 26 is disposed in the apparatus, it is desirable to cut off a short section of the end to establish a reference end for subsequent full stroke cut lengths. Additionally the open end of the length 26 as it comes from the filling apparatus (not shown) may have become contaminated or dried and it is best to cut it off. Since the grab mechanism 32 prevents upward movement of the length 26, once the length 26 has advanced to said grab mechanism and been severed, that point is the reference end of the remainder of the length. The trim end is discarded to waste.

Instead of an intermediate stop member 33, independent control of the grab mechanisms may be used to permit advance of only a short trim end for the initial movement of the carriage, as will be described.

A cutter wheel 34 mounted on a swinging arm 36 is arranged to move across the length of tubing protruding from the bottom of the lower grab mechanism 32. This arm 36 is driven by a suitable linkage 38 through a cutter control 40 that is in turn driven by the upper movement of the carriage 14 through a linkage 42. In one practical device, the cutter control 40 included a one-way clutch mechanism that was quiescent or cocked when the carriage was moving downwardly, but was operative when the carriage 14 was moving upwardly after the length 26 had stopped. The addition of a rotary rachet mechanism enabled the arm 36 to be swung in one pass for each cycle of back and forth movement of the carriage, and then to swing in a reverse pass for the next cycle. Many other cutter drive mechanisms will suggest themselves to those skilled in this art.

A refinement comprised a ratchet mechanism 44 which gave the cutter wheel a slight rotary movement for each pass to present a new surface to the length of tubing. A suitably designed wheel will rotate slightly with each pass and not require the ratchet.

A platform 46 is secured to the support 12 and a cuvette or other carrier 48 of a type which is to receive the broken off length of capillary tubing is mounted to the platform to receive the length as broken off. To break the length off after it has been separated from the body of the tubing 26 by a score line, one need only laterally strain the lower end of the tubing, that is—the portion which is protruding into the carrier or cuvette 48. This can be done manually, by holding the cuvette 48 and tipping it—or can be done by an arm or yoke 50 mounted on the platform 46. Many other ways of breaking off the bottom end may be used.

After the cuvette 48 has the broken short length in it, it is removed for further processing and replaced by another cuvette.

In FIG. 2 diagrammatic details of grab mechanisms are shown. As for the upper grab mechanism 28, there is a friction arm 50 which is biased to rotate counter-clockwise about the pivot 52 by the spring 54 so that when the length of tubing 26 is in place, the friction surface 56 will engage the side of the length of tubing, clamping the same to the back-up member 58. The slightest upward movement of the length of tubing 26 relative to the carriage 14 more tightly wedges the friction arm 50 against the back-up member 58, and so the downward movement of the carriage carries the length of tubing downward also. If there is any resistance to upward movement of the length 26, as for example when carriage 14 moves upward and the lower end of the length 26 is held against movement, there is a simple slippage of the carriage relative to the length 26 because arm 50 tends to rotate clockwise against spring 54, releasing length 26.

The lower grab mechanism 32 is constructed in the same way, but has a reverse function. There is a friction arm 60 pivoted at 62 and biased to move in a counter-clockwise direction by the spring 64 bringing the friction surface 66 into engagement with the tubing and clamping it against the back-up member 68. Any upward sliding movement of the length of tubing 26 more tightly wedges the friction arm 60 against the back-up member 68 with the length of tubing between. Downward sliding movement of the length of tubing 26 will engage the friction surface 66 and tend to move the arm 60 clockwise against the spring 64, this movement separating the arm 60 from the back-up member 68. This frees the engagement and the length of tubing 26 readily slides downwardly past the grab mechanism 32.

Reviewing again the operation of the apparatus, the carriage 14 is moved downwardly, the length 26 is grabbed by the mechanism 28 and slips past the mechanism 32. When the downward stroke is completed, the carriage 14 is pulled upward by the spring 16. The length of tubing 26 is grabbed by the lower mechanism 32 and held tightly so that it cannot move relative to the support 12. The carriage moves upward and the mechanism 28 freely permits passage of the tubing 26 past itself.

A grab control 70 is provided to release the grab mechanism when it is desired to insert a length of tubing or remove the same and can be used for controlling the fed length of tubing. For example, in FIG. 2 the extensions 72 and 74 may be individually moved or moved together to rotate the respective arms against their springs to open what might be termed the "throats" of the grab mechanisms.

Consider for example an initial condition when the apparatus 10 is to be put into use. By manual or other command or manipulation, the grab control 70 is caused to move the arms 76 and 78 together to the right as viewed in FIG. 1, this action causing the extensions 72 and 74 of the yoke 75 to rotate both of the friction arms 50 and 60 clockwise, opening the throats and providing a clear space into which a length of capillary tubing 26 may be placed or deposited. Once this has been done, the arms 76 and 78 can be moved to the left to cause the length of tubing to be gripped for movement axially, that is, lengthwise of the tubing.

As previously mentioned, instead of limiting the stroke of the carriage 14 for the purpose of trimming the end of a newly installed length of tubing 26, the grab mechanisms 28 and 32 may accomplish the same function. Thus, a lever 80 in the path of the carriage, or even connected to the handle 22 could initiate the function of trimming. For example, in FIG. 1, the handle 22 may have a lost motion connection with the carriage 14 at 82 so that the first downward movement engages the lever 80 before the carriage 14 starts to move, and operates the trim control mechanism 84. This mechanism may be any suitable mechanical or electrical device coupled through a connection 86 with the grab control 70. The two alternate locations of this trim control are shown in the respective views.

The operation of the trim control 84 would be to push the arm 76 to the right without pushing the arm 78 so that for a predetermined length of the stroke of the carriage 14 downward the grab mechanism 28 is not holding the length of tubing 26, but on the contrary permits it to slip past the throat. At the bottom of the stroke, the arm 76 returns to the normal position, the lever 50 moves tightly against the tube length and the friction surface 56 locks the length in place. Thereafter for the remainder of the stroke of the carriage, the length is fed past the grab mechanism 32. Prior to this time, for the first part of the stroke, the length did not move at all.

The advantage of this type of trim mechanism over that using a stop member such as 33 is that the total mechanical stroke of the carriage 14 can be the same when trimming or cutting, so that movement of the carriage may be used to perform other mechanical functions.

The trimming function is performed only once for each length of tubing, such that after one operation the trim control 84 is disabled for the remaining cuts taken of the length 26. The grab control 70 may be manually operated for these various functions by suitable means, to move the arms 76 and 78. It will be appreciated that the arms 76 and 78 should be moved to the left together after the long dimension of the length 26 is too short to enable the grab mechanisms 28 and 32 cooperatively to function, at which time the remanent section is removed from or dropped out of the apparatus 10 to make way for a new length.

The stroke of the carriage and the length of trim may be readily adjusted by choice of suitable mechanisms.

It will be appreciated that the lengths of tubing 26 contain sample fluids, each length being preferably provided with a sealed end so that the fluids are retained during the operation of the apparatus 10. As stated, the disposition of the length during cutting need not be vertical.

What it is desired to secure by Letters Patent of the United States is:

We claim:

1. A feeding and cutting apparatus for capillary tubing, comprising:

A. a support structure having a carriage reciprocable thereon between two positions defining a stroke of predetermined length, B. means for moving the carriage from its first position toward its second position when desired and return means for returning the carriage to the said first position, C. means on the carriage for laterally confining a length of capillary tubing having an axial dimension several times the extent of the said stroke, but permitting lengthwise movement of the length of capillary tubing, D. first unilateral grab means on said carriage adapted to have the length of capillary tubing engaged thereby and preventing movement of the said length of capillary tubing relative to the carriage in a direction which would tend to move the length of tubing toward said first position but permitting movement of the length of tubing relative to the carriage in a direction which would tend to move the length of tubing toward the second position, E. second unilateral grab means connected to said support structure and aligned with and adapted to have the length of capillary tubing engaged thereby but acting upon said length with permitting and preventing functions opposite those of said first grab mechanism, whereby each movement of the carriage from its first position toward its second position will feed a portion of the length of capillary tubing past the second grab means, the axial dimension of said portion at most being equal to the extent of said last-mentioned movement, F. means for cutting said length to define said portion and enable said portion to be broken from said length, G. means for controlling the first unilateral grab means, H. means for controlling the second unilateral grab means, and K. means for controlling the trimming of the end of a length of tubing, L. wherein the cutting means comprise a scoring wheel connected with and driven by the movement of the carriage.

2. The apparatus as claimed in claim 1 in which the connection between said scoring wheel and carriage is inoperative when said carriage is moving from its first position toward its second position, but is operative only when the carriage is returning to its first position, whereby the cutting operation will be performed only when the length of tubing is not moving.

3. The apparatus as claimed in claim 1 in which means are provided to rotate the scoring wheel with movement of the carriage to present a different cutting edge for each such movement.

4. A feeding and cutting apparatus for capillary tubing, comprising:

A. a support structure having a carriage reciprocable thereon between two positions defining a stroke of predetermined length, B. means for moving the carriage from its first position toward its second position when desired and return means for returning the carriage to the said first position, C. means on the carriage for laterally confining a length of capillary tubing having an axial dimension several times the extent of the said stroke, but permitting lengthwise movement of the length of capillary tubing, D. first unilateral grab means on said carriage adapted to have the length of capillary tubing engaged thereby and preventing movement of the said length of capillary tubing relative to the carriage in a direction which would tend to move the length of tubing toward said first position but permitting movement of the length of tubing relative to the carriage in a direction which would tend to move the length of tubing toward the second position, E. second unilateral grab means connected to said support structure and aligned with and adapted to have the length of capillary tubing engaged thereby but acting upon said length with permitting and preventing functions opposite those of said first grab mechanism, whereby each movement of the carriage from its first position toward its second position will feed a portion of the length of capillary tubing past the second grab means, the axial dimension of said portion at most being equal to the extent of said last-mentioned movement, F. means for cutting said length to define said portion and enable said portion to be broken from said length, G. means for controlling the first unilateral grab means, H. means for controlling the second unilateral grab means, K. means for controlling the trimming of the end of a length of tubing, L. wherein the carriage movement is vertical, with the first position being higher than said second position, in which the support structure includes means for mounting a cuvette in position to receive the length as it is being fed past the second grab means, whereby when broken from said length, said portion will fall by gravity into said cuvette, and M. including means for applying lateral strain to the said portion.

5. A feeding and cutting apparatus for capillary tubing, comprising:

A. a support structure having a carriage reciprocable thereon between two positions defining a stroke of predetermined length, B. means for moving the carriage from its first position toward its second position when desired and return means for returning the carriage to the said first position, C. means on the carriage for laterally confining a length of capillary tubing having an axial dimension several times the extent of the said stroke, but permitting lengthwise movement of the length of capillary tubing, D. first unilateral grab means on said carriage adapted to have the length of capillary tubing engaged thereby and preventing movement of the said length of capillary tubing relative to the carriage in a direction which would tend to move the length of tubing toward said first position but permitting movement of the length of tubing relative to the carriage in a direction which would tend to move the length of tubing toward the second position, E. second unilateral grab means connected to said support structure and aligned with and adapted to have the length of capillary tubing engaged thereby but acting upon said length with permitting and preventing functions opposite those of said first grab mechanism, whereby each movement of the carriage from its first position toward its second position will feed a portion of the length of capillary tubing past the second grab means, the axial dimension of said portion at most being equal to the extent of said last-mentioned movement, F. means for cutting said length to define said portion and enable said portion to be broken from said length, G. means for controlling the first unilateral grab means, H. means for controlling the second unilateral grab means, and K. means for controlling the trimming of the end of a length of tubing, L. means to vary the axial dimension of the said portion, M. wherein said last means include stop means to provide an intermediate position between said first and second positions.

6. A feeding and cutting apparatus for capillary tubing comprising:

A. a support structure having a carriage reciprocable thereon between two positions defining a stroke of predetermined length, B. means for moving the carriage from its first position toward its second position when desired and return means for returning the carriage to the said first position, C. means on the carriage for laterally confining a length of capillary tubing having an axial dimension several times the extent of the said stroke, but permitting lengthwise movement of the length of capillary tubing, D. first unilateral grab means on said carriage adapted to have the length of capillary tubing engaged thereby and preventing movement of the said length of capillary tubing relative to the carriage in a direction which would tend to move the length of tubing toward said first position but permitting movement of the length of tubing relative to the carriage in a direction which would tend to move the length of tubing toward the second position, E. second unilateral grab means connected to said support structure and aligned with and adapted to have the length of capillary tubing engaged thereby but acting upon said length with permitting and preventing functions opposite those of said first grab mechanism, whereby each movement of the carriage from its first position toward its second position will feed a portion of the length of capillary tubing past the second grab means, the axial dimension of said portion at most being equal to the extent of said last-mentioned movement, F. means for cutting said length to define said portion and enable said portion to be broken from said length, G. means for controlling the first unilateral grab means, H. means for controlling the second unilateral grab means, and K. means for controlling the trimming of the end of a length of tubing, L. means to vary the axial dimension of the said portion, M. wherein said last means comprise a grab release mechanism operable upon said first grab means to render same inoperative during a portion of said stroke.

7. A feeding and cutting apparatus for capillary tubing, comprising:

A. a support structure having a carriage reciprocable cable thereon between two positions defining a stroke of predetermined length, B. means for moving the carriage from its first position toward its second position when desired and return means for returning the carriage to the said first position, C. means on the carriage for laterally confining a length of capillary tubing having an axial dimension several times the extent of the said stroke, but permitting lengthwise movement of the length of capillary tubing, D. first unilateral grab means on said carriage adapted to have the length of capillary tubing engaged thereby and preventing movement of the said length of capillary tubing relative to the carriage in a direction which would tend to move the length of tubing toward said first position but permitting movement of the length of tubing relative to the carriage in a direction which would tend to move the length of tubing toward the second position, E. second unilateral grab means connected to said support structure and aligned with and adapted to have the length of capillary tubing engaged thereby but acting upon said length with permitting and preventing functions opposite those of said first grab mechanism, whereby each movement of the carriage from its first position toward its second position will feed a portion of the length of capillary tubing past the second grab means, the axial dimension of said portion at most being equal to the extent of said last-mentioned movement, F. means for cutting said length to define said portion and enable said portion to be broken from said length, G. means for controlling the first unilateral grab means, H. means for controlling the second unilateral grab means, K. means for controlling the trimming of the end of a length of tubing, the first and second unilateral grab means each including L. a friction arm pivotably mounted on the carriage and comprising a friction surface, M. a spring for biasing the friction arm to move in a counter-clockwise direction, N. a back-up member connected to the carriage, wherein, when the length of tubing is in place the friction surface will engage the side of the length of tubing and clamp it to the back-up member, O. the means for controlling the first and second unilateral grab means each including an arm, a yoke linked to the arm and having an extension positioned such as to engage the pivotable friction arm, wherein when the grab control means is caused to move the arm the extension will rotate the friction arm clockwise against the force of the spring so as to open the clamping of the length of tubing.

* * * * *